(12) United States Patent
Sun et al.

(10) Patent No.: US 11,494,655 B2
(45) Date of Patent: Nov. 8, 2022

(54) RANDOM MATRIX HARDWARE FOR MACHINE LEARNING

(71) Applicant: INTERNATIONAL BUSINESS MACHINES CORPORATION, Armonk, NY (US)

(72) Inventors: Xiao Sun, Yorktown Heights, NY (US); Youngseok Kim, Urbana, IL (US); Chun-Chen Yeh, Danbury, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1370 days.

(21) Appl. No.: 15/836,098

(22) Filed: Dec. 8, 2017

(65) Prior Publication Data
US 2019/0180185 A1    Jun. 13, 2019

(51) Int. Cl.
| G06F 15/80 | (2006.01) |
| G06F 7/58 | (2006.01) |
| G06K 9/62 | (2022.01) |
| G06F 17/16 | (2006.01) |
| G06N 3/08 | (2006.01) |
| G06V 10/94 | (2022.01) |

(52) U.S. Cl.
CPC ............ *G06N 3/084* (2013.01); *G06F 7/58* (2013.01); *G06F 15/8007* (2013.01); *G06F 17/16* (2013.01); *G06K 9/6256* (2013.01); *G06K 9/6271* (2013.01); *G06V 10/955* (2022.01)

(58) Field of Classification Search
CPC ........ G06F 15/8007; G06F 17/16; G06F 7/58; G06K 9/6256; G06K 9/6271; G06N 3/063; G06N 3/084; G06V 10/82; G06V 10/955
See application file for complete search history.

(56) References Cited

U.S. PATENT DOCUMENTS

| 6,047,068 A | 4/2000 | Rhelimi et al. |
| 7,426,501 B2 * | 9/2008 | Nugent .................. G06N 3/063 706/26 |
| 8,271,796 B2 * | 9/2012 | Diamond .............. H04L 9/3066 713/168 |
| 8,311,965 B2 | 11/2012 | Breitwisch et al. |
| 83,335,752 | 12/2012 | Knoblauch |
| 9,489,623 B1 | 11/2016 | Sinyavskiy et al. |

(Continued)

OTHER PUBLICATIONS

Ping Chi, "PRIME: A Novel Processing-in-memory Architecture for Neural Network Computation in ReRAM-based Main Memory," Jun. 18, 2016, 2016 ACM/IEEE 43rd Annual International Symposium on Computer Architecture, pp. 27-33.*

(Continued)

*Primary Examiner* — Omar S Ismail
(74) *Attorney, Agent, or Firm* — Tutunjian & Bitetto, P.C.; Robert Sullivan

(57) ABSTRACT

A computer-implemented method for training a random matrix network is presented. The method includes initializing a random matrix, inputting a plurality of first vectors into the random matrix, and outputting a plurality of second vectors from the random matrix to be fed back into the random matrix for training. The random matrix can include a plurality of two-terminal devices or a plurality of three-terminal devices or a film-based device.

20 Claims, 12 Drawing Sheets

(56) References Cited

U.S. PATENT DOCUMENTS

| | | | | |
|---|---|---|---|---|
| 2007/0244951 | A1* | 10/2007 | Gressel | H04L 9/12 708/252 |
| 2009/0063529 | A1* | 3/2009 | Gustavson | G06F 17/16 |
| 2014/0074719 | A1* | 3/2014 | Gressel | G06Q 30/06 713/168 |
| 2015/0242747 | A1* | 8/2015 | Packes | G06N 3/0454 706/17 |
| 2016/0328659 | A1* | 11/2016 | Mohseni | G06N 10/00 |
| 2017/0109626 | A1 | 4/2017 | Gokmen et al. | |
| 2018/0189675 | A1* | 7/2018 | Nurvitadhi | G06F 17/16 |

OTHER PUBLICATIONS

An Chen, "A Comprehensive Crossbar Array Model With Solutions for Line Resistance and Nonlinear Device Characteristics," Mar. 7, 2013, IEEE Transactions on Electron Devices, vol. 60, No. 4, Apr. 2013, pp. 1318-1322.*

Mohamed Haykel Ben Jamaa , "Variability-Aware Design of Multilevel Logic Decoders for Nanoscale Crossbar Memories," Oct. 21, 2008, IEEE Transactions on Computer-Aided Design of Integrated Circuits and Systems, vol. 27, No. 11, Nov. 2008, pp. 2053-2059.*

Tayfun Gokmen , "Acceleration of Deep Neural Network Training with Resistive Cross-Point Devices: Design Considerations," Jul. 21 Mar. 2016, vol. 10|Article 333 Frontiers in Neuroscience | www.frontiersin.org, pp. 2-13.*

Amir Morad ,"Efficient Dense and Sparse Matrix Multiplication on GP-SIMD," Nov. 13, 2014, 2014 24th International Workshop on Power and Timing Modeling, Optimization and Simulation (PATMOS), pp. 1-6.*

Pierre Baldi et al., Learning in the Machine: Random Backpropagation and the Learning Channel, Computer Science, Learning, Dec. 2016.

Tayfun Gokmen et al., Acceleration of Deep Neural Network Training with Resistive Cross-Point Devices: Design Considerations, Frontiers in Neuroscience, Jul. 2016, vol. 10.

Timothy P. Lillicrap et al., Random synaptic feedback weights support error backpropagation for deep learning, Nature Communications, Nov. 2016.

T.R. Oldham et al., Total Ionizing Dose Effects in MOS Oxides and Devices, IEEE Transactions on Nuclear Science, Jun. 2003.

* cited by examiner

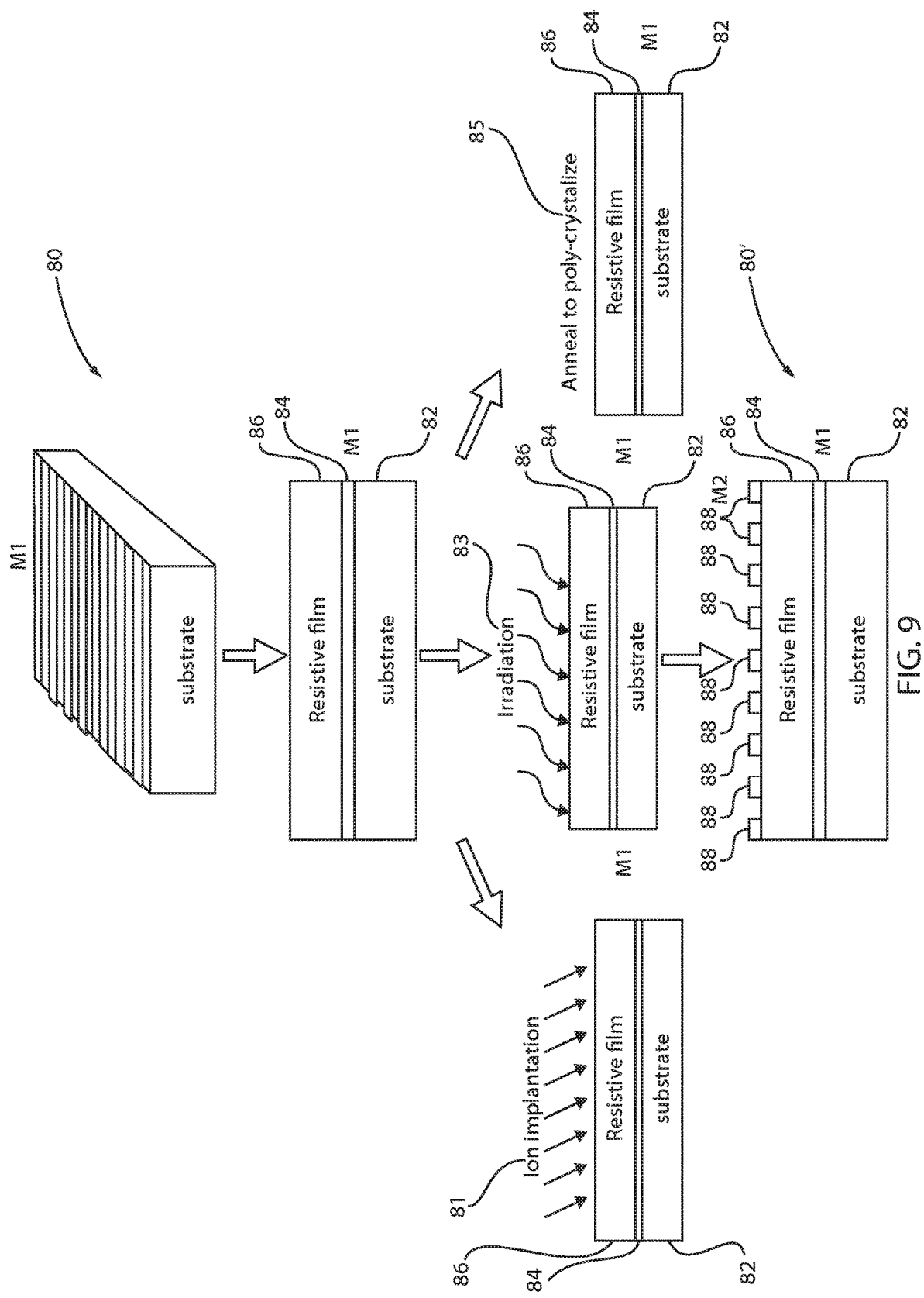

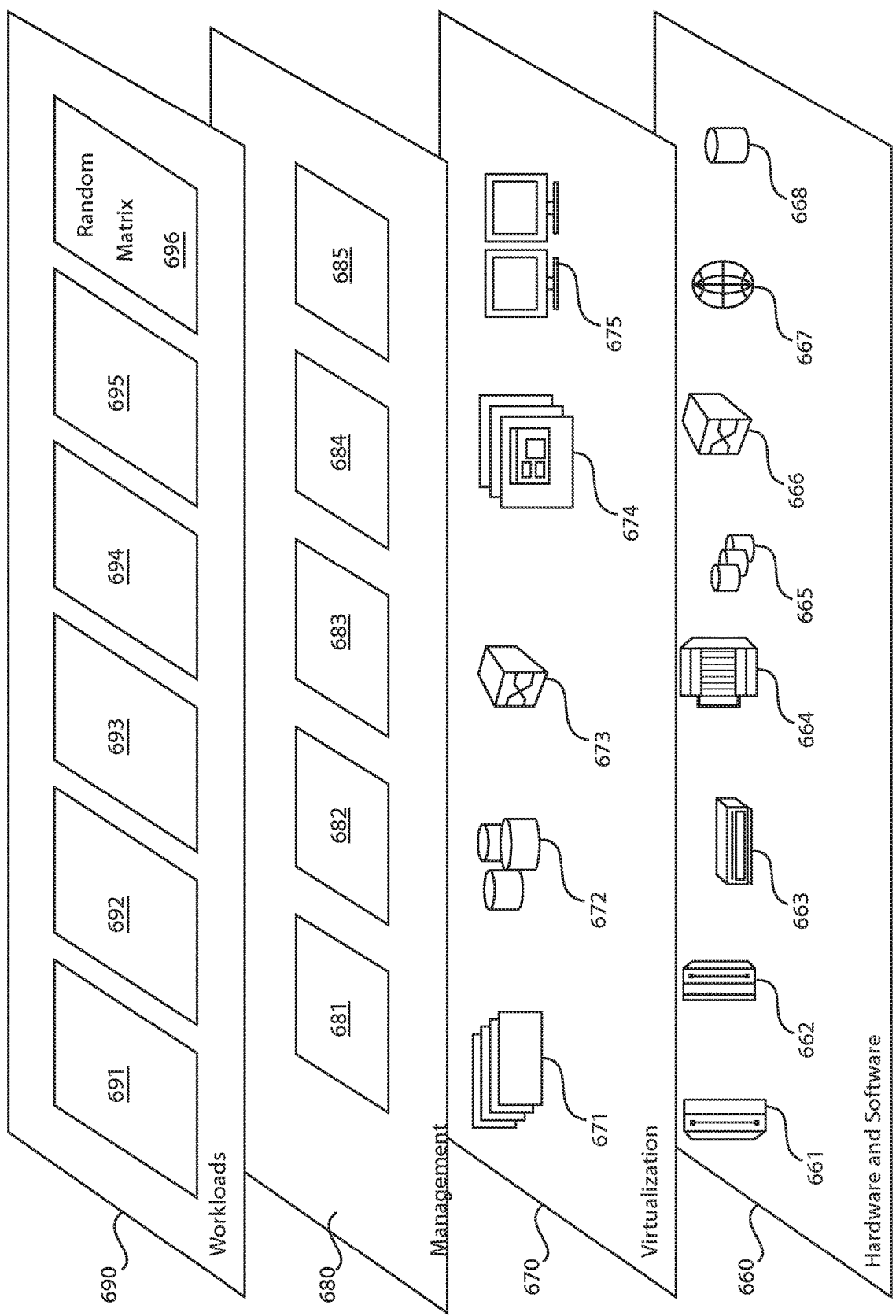

RANDOM MATRIX HARDWARE FOR MACHINE LEARNING

BACKGROUND

Technical Field

The present invention relates generally to machine learning, and more specifically, to random matrix hardware for machine learning.

Description of the Related Art

Neural networks include a large number of interconnected nodes. In some classes of neural networks, the nodes are separated into different layers and the connections between the nodes are characterized by associated weights. Each node has an associated function causing it to generate an output dependent on signals received on each input connection and the weights of those connections. Neural networks are adaptive, in that the connection weights can be adjusted to change the response of the network to a particular input or class of inputs. Conventionally, artificial neural networks can be trained by using a training set including a set of inputs and corresponding expected outputs. The goal of training is to tune a network's parameters so that the network performs well on the training set. To achieve this, an error signal is generated from a difference between an expected output and an actual output of the network, and a summary of the error called the loss is computed. Network parameters can be tuned to reduce the loss by backpropagation of error methods.

The backpropagation of error learning (or 'backprop'), computes a precise gradient of the loss with respect to the network weights. This gradient is used as a training signal and is generated from forward connection weights and an error signal, and is fed back to modify the forward connection weights. Backprop thus requires that the error be fed back through the network via a pathway which depends explicitly and intricately on the forward connections. This requirement of a strict match between the forward path and the feedback path can cause inefficiencies within the neural networks.

SUMMARY

In accordance with one embodiment, a computer-implemented method executed by a processor for training a random matrix network is provided. The computer-implemented method includes initializing a random matrix by a random initializer, inputting, by an input generator, a plurality of first vectors into the random matrix, and outputting, by an output vector reader, a plurality of second vectors from the random matrix to be fed back into the random matrix for training.

In accordance with another embodiment, a random matrix network is provided. The random matrix network includes a random initializer for initializing a random matrix, an input generator for inputting a plurality of first vectors into the random matrix, and an output vector reader for reading a plurality of second vectors outputted from the random matrix to be fed back into the random matrix for training.

In accordance with yet another embodiment, a digital processing architecture for training and/or inferencing a random matrix is provided. The digital processing architecture for training and/or inferencing the random matrix includes a random matrix network including at least the random matrix having an array of elements connected between row and column lines, at least one first single instruction, multiple data processing (SIMD) unit connected to the row lines, at least one second SIMD unit connected to the column lines, and a shared memory shared between the at least one first and second SIMDs.

Furthermore, embodiments can take the form of a related computer program product, accessible from a computer-usable or computer-readable medium providing program code for use, by or in connection with a computer or any instruction execution system. For the purpose of this description, a computer-usable or computer-readable medium may be any apparatus that may include means for storing, communicating, propagating or transporting the program for use, by or in a connection with the instruction execution system, apparatus, or device.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The invention will provide details in the following description of preferred embodiments with reference to the following figures wherein:

FIG. 9 is a schematic diagram of a process flow for constructing a thin-film based structure, in accordance with an embodiment of the present invention;

FIG. 18 is a schematic diagram of exemplary abstraction model layers, in accordance with an embodiment of the present invention.

Throughout the drawings, same or similar reference numerals represent the same or similar elements.

DETAILED DESCRIPTION

Figure 1:
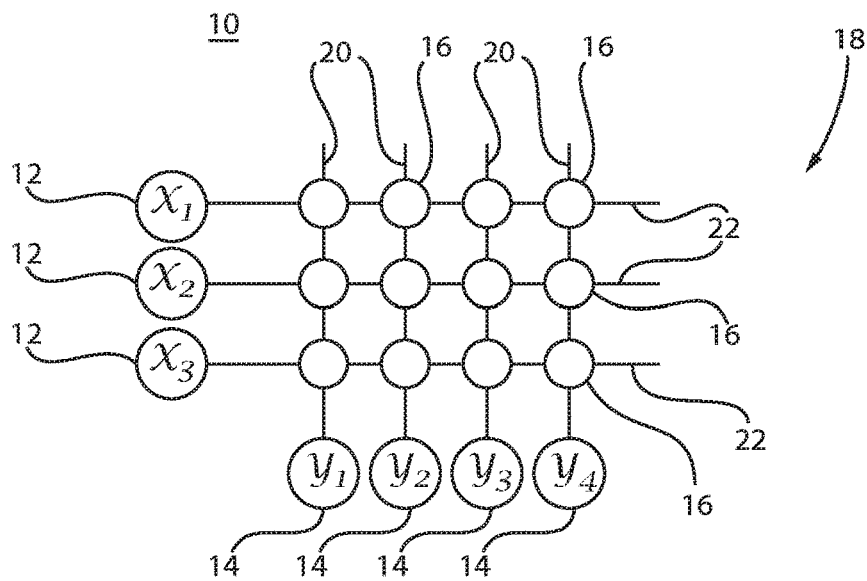
FIG. 1 is a block/flow diagram of an exemplary neuromorphic device architecture with cells or nodes conducting analog computer operations, in accordance with an embodiment of the present invention.

Embodiments in accordance with the present invention provide methods and devices for machine learning and deep learning. Deep learning mimics a behavior of mammal brains in order to extract a meaningful representation from a high dimensional input. Data is passed through multiple layers of a network. The primary layers extract low-level cues, such as edges and corners for natural images. Deeper layers compose simple cues from previous layers into higher-level features. In this way, powerful representations emerge at the end of the neural network.

Embodiments in accordance with the present invention provide methods and devices for machine learning and deep learning by neural networks via training. An algorithm employed for training can be a backpropagation algorithm. After giving the neural network an input, the neural network produces an output, and the next step is to teach the neural network what should have been the correct output for that input (e.g., an ideal output). The neural network takes this ideal output and starts adjusting the weights to produce a more accurate output the next time around, starting from the output layer and going backwards until reaching the input layer. Thus, next time that same input is inputted into the neural network, the input is going to give an output closer to that ideal one that the neural network was trained to output. The process is repeated for several iterations until an error between the ideal output and the one output by the neural network is considered to be small enough. The backpropagation algorithm can adjust the weights to correct for the errors by using gradient descent calculations.

Embodiments in accordance with the present invention provide methods and devices for employing random backpropagation algorithms for correcting errors. In machine learning, backpropagation algorithms assign blame by multiplying error signals with synaptic weights on each neuron's axon and further downstream. The present invention assigns blame by multiplying errors by random synaptic weights. This mechanism can transmit teaching signals across multiple layers of neurons and can perform backpropagation on a variety of tasks. In the present invention, these tasks can include implementing random matrices by two-terminal devices, three-terminal devices, and film-based devices. A random matrix network can be constructed from two-terminal devices, such as resistive switching devices based on various mechanisms such as a conducting bridge, phase change memory, magnetic switching resistance, etc. A random matrix can also be constructed from three-terminal devices, such as Flash field effect transistors (FETs), ferroelectric FETs, etc. A random matrix can further be constructed from a film-based structure with an original randomized nature, such as polycrystalline films, semiconductor films, etc. Value initialization of the random matrices can be achieved by electrical pulses, radiation, as well as processing approaches.

Embodiments in accordance with the present invention provide methods and devices for computer architectures where two-terminal, three-terminal, and film-based structures are employed in cross-point configurations as processing units to accelerate computational operations for applications, such as, e.g., neural network training algorithms and random matrix operations. The cross point devices can be organized so that the cross point devices become programmable. This provides advantages in many areas of computation. For example, instead of designing an application specific integrated circuit (ASIC) for each application, the architecture in accordance with the present invention permits use of a same architecture by simply writing instructions to perform the needed task or algorithm. Different instruction sets can be designed and issued in a given order to provide desired computational results.

In useful embodiments, the programmable cross point devices can be employed as analog processing elements and accompanied with programmable peripheral circuitry. Using this architecture, fast analog computations can be performed at a core, and peripheral circuitry can be programmed to achieve a desired functionality and/or algorithm. The architecture can include a two-dimensional (2D) array of processing units. The 2D array can perform very fast analog computations, such as vector-matrix multiplication, update of a random matrix stored at the analog cross-point devices, etc. The 2D array can be accompanied by a 1D array of digital processing units that can perform single instructions on multiple data and/or be in charge of translating the digital inputs/outputs to analog input/outputs. Using this architecture, code can be written (instruction sets) to program the periphery digital processors. These digital processors can understand the instructions and perform very fast analog computations on the 2D array of two-terminal devices or three-terminal devices. The digital processors at the periphery can also be able to move data within the core and between the cores.

It is to be understood that the present invention will be described in terms of a given illustrative architecture; however, other architectures, structures, substrate materials and process features and steps/blocks can be varied within the scope of the present invention. It should be noted that certain features cannot be shown in all figures for the sake of clarity. This is not intended to be interpreted as a limitation of any particular embodiment, or illustration, or scope of the claims.

Referring now to the drawings in which like numerals represent the same or similar elements and initially to FIG. 1, a block/flow diagram of an exemplary neuromorphic device architecture with cells or nodes conducting analog computer operations is presented, in accordance with an embodiment of the present invention.

The neuromorphic device 10 employs very-large-scale integration (VLSI) systems including electronic analog circuits to mimic neuro-biological architectures present in the nervous system. The neuromorphic device 10 can describe analog, digital, and/or mixed-mode analog/digital VLSI and software systems that implement models of neural systems. The implementation of the neuromorphic device 10 can be realized using an array 18 of cells or nodes 16. The cells or nodes 16 can include, e.g., oxide-based memristors, threshold switches, transistors, resistive devices, etc. The neuromorphic device 10 includes inputs 12 (e.g., $x_1$, $x_2$, $x_3$, . . . ). Inputs 12 can include a first electrical characteristic, such as a voltage. The neuromorphic device 10 includes a set of outputs 14 (e.g., $y_1$, $y_2$, $y_3$, $y_4$, . . . ). Outputs 14 can include a second electrical characteristic, such as current.

The array 18 includes conductors 20 running vertically and conductors 22 running horizontally. The conductors 20 and 22 do not connect directly at intersection points as the conductors 20 and 22 are disposed on different levels. Instead, the conductors 20 and 22 are connected through cross-point devices located at each node 16.

Figure 2:
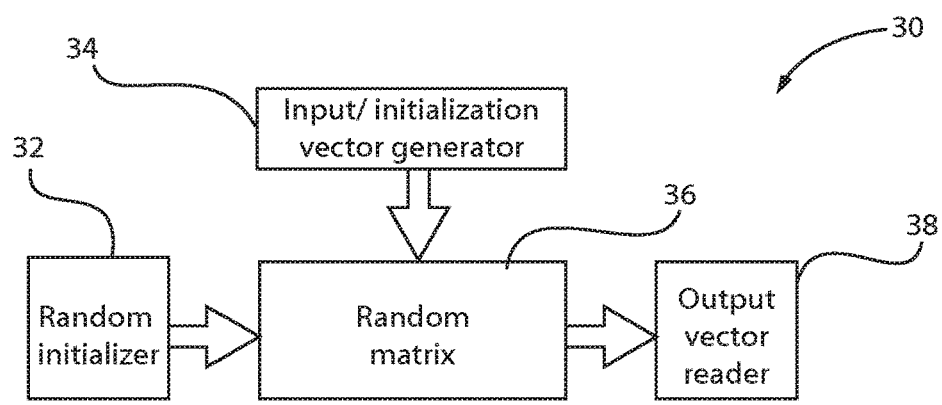
FIG. 2 is a block/flow diagram of an exemplary random matrix network, in accordance with an embodiment of the present invention.

FIG. 2 is a block/flow diagram of an exemplary random matrix network, in accordance with an embodiment of the present invention.

The random matrix network 30 includes a random initializer 32, an input/initialization vector generator 34, a random matrix 36, and an output vector reader 38.

The random initializer 32 can take different forms. In one example, the random initializer 32 can initialize random values of the random matrix 36 by providing electrical pulses to the random matrix 36. In another example, the random initializer 32 can initialize random values of the random matrix 36 by providing radiation to the random matrix 36. In another example, the random initializer 32 can initialize random values of the random matrix 36 by adjusting processing parameters or variables of the devices.

The random matrix 36 can be an array of two-terminal devices or an array of three-terminal devices or a film-based structure. For example, the random matrix 36 can be constructed from two-terminal devices, such as resistive switching devices based on various mechanisms such as a conducting bridge, phase change memory, magnetic switching resistance, etc. In another example, the random matrix 36 can be constructed from three-terminal devices, such as Flash field effect transistors (FETs), ferroelectric FETs, etc. that are connected in area-efficient NAND style. In yet another example, the random matrix 36 can be constructed from a film-based structure with an original randomized nature, such as polycrystalline films, semiconductor films, etc.

The input/initialization vector generator 34 can input a vector of inputs into the random matrix 36 and the output vector reader 38 can output a vector of outputs from the random matrix 36.

Figure 3:
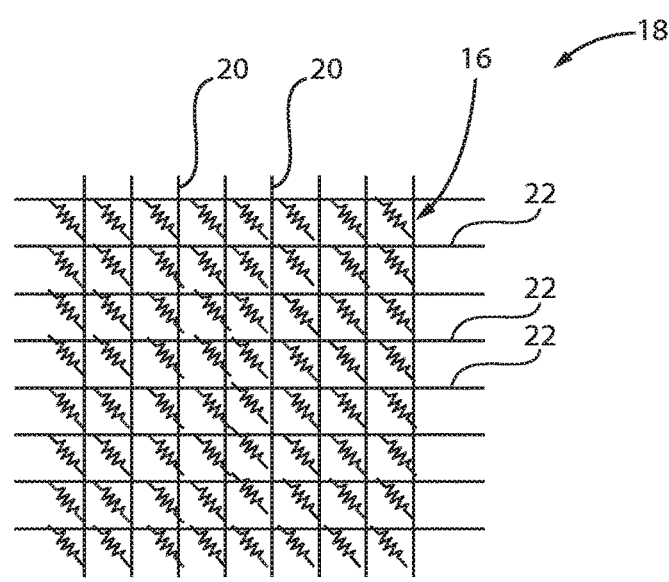
FIG. 3 is a schematic diagram of an exemplary two-terminal device, in accordance with an embodiment of the present invention.

FIG. 3 is a schematic diagram of an exemplary two-terminal device, in accordance with an embodiment of the present invention.

An array 18 of cells or nodes 16 can include resistive devices formed in a cross-bar array. The array 18 includes conductors 20 running vertically and conductors 22 running horizontally. The resistive devices can be used to form the random matrix 36 (FIG. 2). The resistances of the resistive elements can be initialized to random values. The random values of the resistive elements do not shift during training of the neural network.

Figure 4:
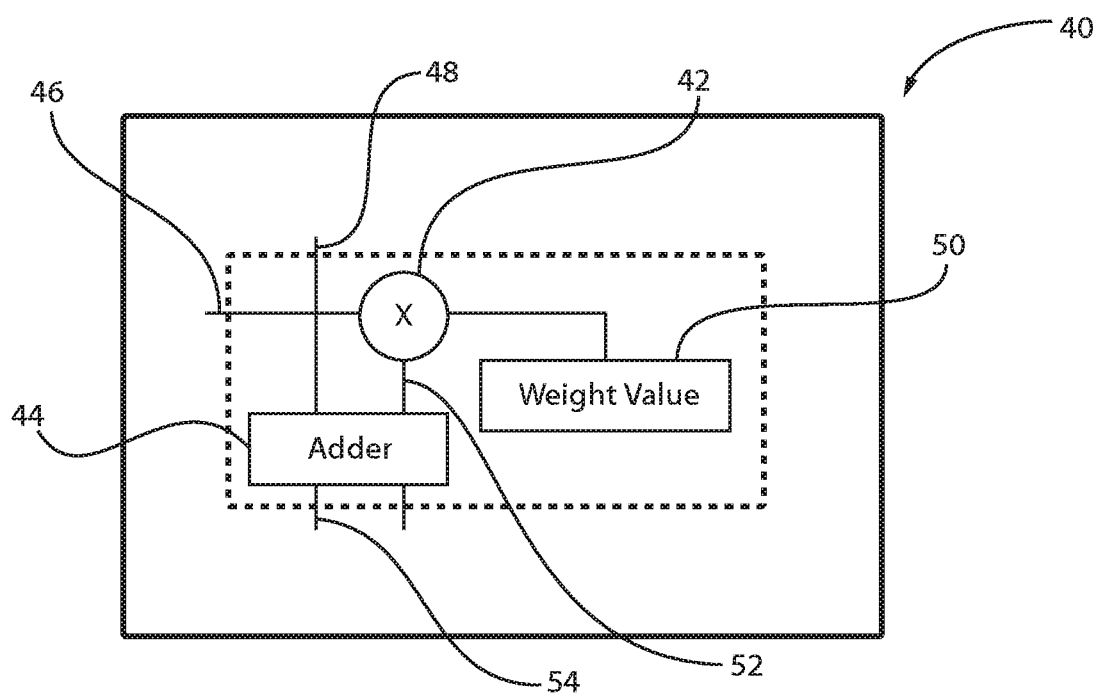
FIG. 4 is a schematic diagram of an exemplary resistive element, in accordance with an embodiment of the present invention.

FIG. 4 is a schematic diagram of an exemplary resistive element, in accordance with an embodiment of the present invention.

Resistive elements 40 can be configured to perform the computation of multiplying a weight value 50 (e.g., a conductance) by a voltage or other input on line 46 using a multiplier 42. A multiplication result 52 and a previous result from line 48 are added by an adder 44 and output on line 54. Depending on the number of resistive elements 40 in the array, the results are accumulated. For example, in the example above, the operation can be performed over three resistive elements 40.

The resistive elements 40 can be programmed by changing the resistance or conductance across a dielectric solid-state material. Different types of cells can be employed for the resistive elements 40, e.g., a memristor, resistive random access memory (RRAM), conductive bridging (CBRAM) or phase-change memory (PCM). CBRAM involves one electrode providing ions that dissolve readily in an electrolyte material, while PCM involves generating sufficient Joule heating to affect amorphous-to-crystalline or crystalline-to-amorphous phase changes. RRAM generates defects in a thin oxide layer, known as oxygen vacancies (oxide bond locations where the oxygen has been removed), which can subsequently charge and drift under an electric field. The motion of oxygen ions and vacancies in the oxide would be analogous to the motion of electrons and holes in a semiconductor.

Figure 5:
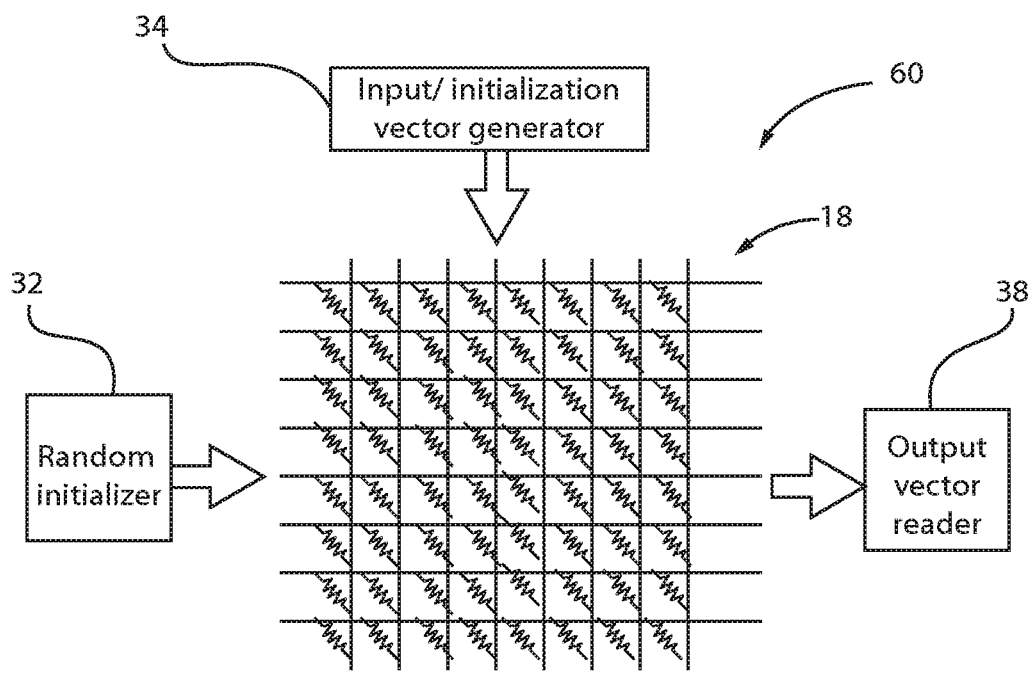
FIG. 5 is a schematic diagram of an exemplary two-terminal device random matrix network, in accordance with an embodiment of the present invention.

FIG. 5 is a schematic diagram of an exemplary two-terminal device random matrix network 60, in accordance with an embodiment of the present invention.

In one exemplary embodiment, the random matrix can be an array 18 of resistive elements 40. The array 18 of resistive elements 40 can be fed random values by the random initializer 32. Additionally, an input/initialization vector generator 34 provides a vector of inputs to the array 18 of resistive elements 40. The output vector reader 38 reads a vector of outputs from the array 18 of resistive elements 40.

Figure 6:
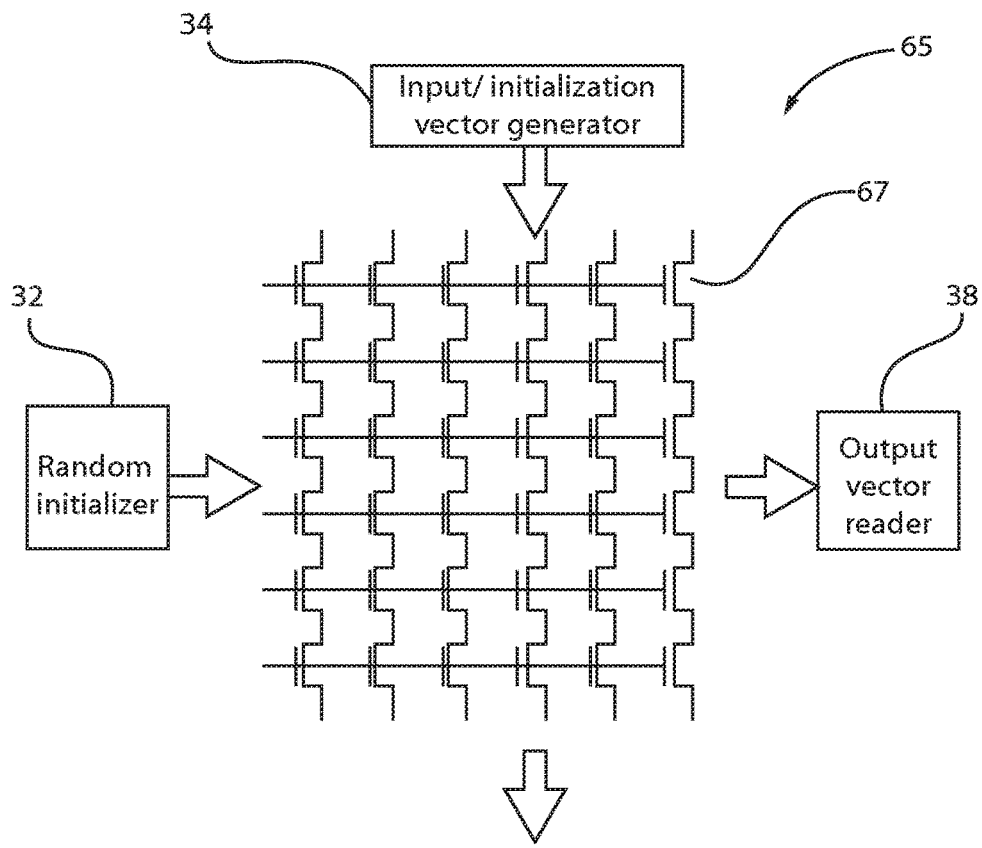
FIG. 6 is a schematic diagram of an exemplary three-terminal device random matrix network, in accordance with an embodiment of the present invention.

FIG. 6 is a schematic diagram of an exemplary three-terminal device random matrix network 65, in accordance with an embodiment of the present invention.

In one exemplary embodiment, the random matrix can be an array of transistors 67. The array of transistors 67 can be fed random values by the random initializer 32. Additionally, an input/initialization vector generator 34 provides a vector of inputs to the array of transistors 67. The output vector reader 38 reads a vector of outputs from the array of transistors 67.

The FET based random matrix can be formed by Flash memory devices or ferroelectric FET (FeFET) devices, with the channel resistance as the matrix element value. In a read operation, input vectors can be connected to a source or gate, and a current as an output can be collected at a drain. For a normal weight matrix, which is bidirectional, the asymmetry between source and gate would cause extra circuitries. However, in accordance with present invention, the unidirectional nature of random matrices eliminates any asymmetric issues and need for updates. Since the random matrix does not need update, NAND structures can be adopted to form a Flash memory or a FeFET based network with area efficiency. Moreover, if using a FeFET, initialization may not be needed due to the multi-domain nature of the ferroelectric film. The initial ferroelectric polarization is in normal distribution, thus resulting in normally-distributed random matrices.

Figure 7:
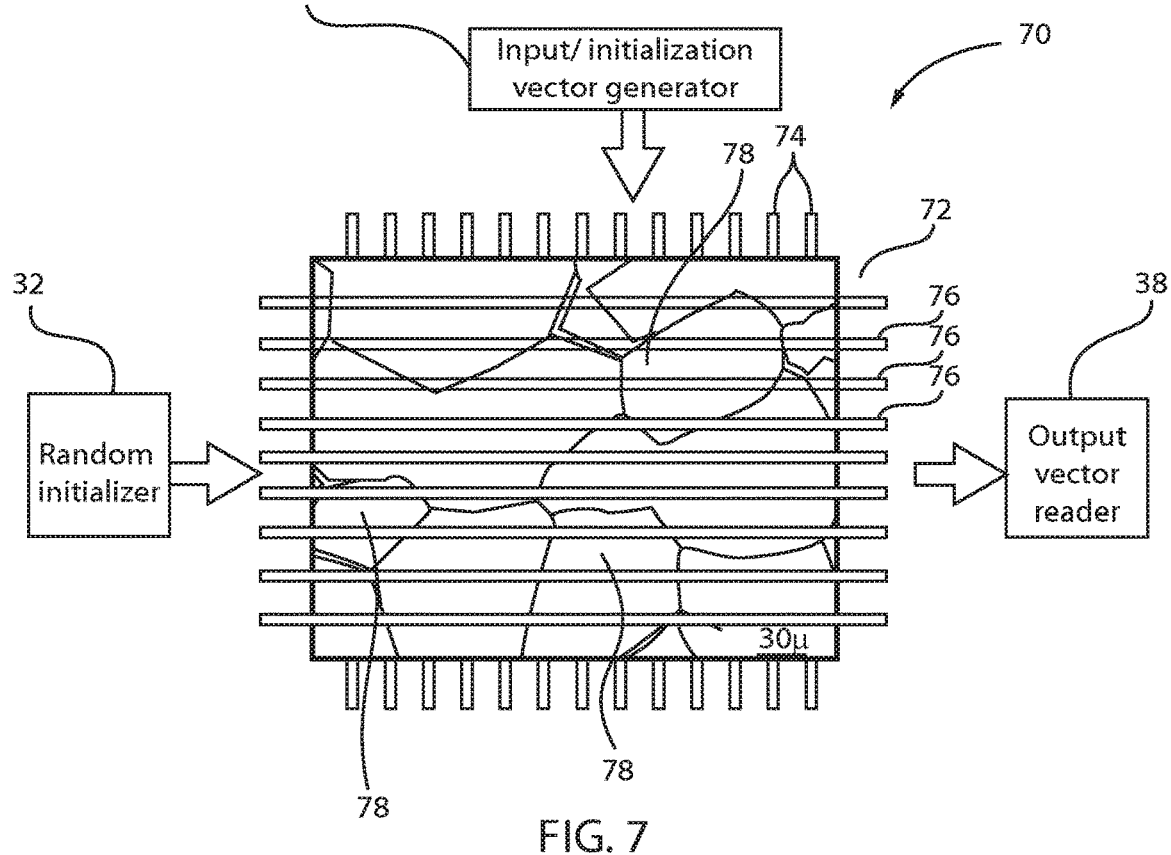
FIG. 7 is a schematic diagram of an exemplary thin-film based structure random matrix network, in accordance with an embodiment of the present invention.

FIG. 7 is a schematic diagram of an exemplary thin-film based structure random matrix network 70, in accordance with an embodiment of the present invention.

In one exemplary embodiment, the random matrix can be a film-based structure 72. The film-based structure 72 can be fed random values by the random initializer 32. Additionally, an input/initialization vector generator 34 provides a vector of inputs to the film-based structure 72. The output vector reader 38 reads a vector of outputs from the film-based structure 72.

Different from weight matrices in neural networks, random matrices in neural network circuits will not be updated frequently (or at all), and, therefore a film based structure 72 is sufficient as long as the weight value is random and stable. In the film based random matrix 70, the top electrodes 76 and bottom electrodes 74 are aligned in a cross-bar array, and a film 78 is placed between them without isolation or forming any individual devices. The film 78 can gain its random nature from poly-crystallization (e.g., by annealing), radiation, ion implantation, engineering domain walls, etc. The resistance between a top electrode bar 76 and a bottom electrode bar 74 can be determined by the film structure in the local area where the two electrode bars cross (ignoring the lateral conductions), which has a nature of randomness.

Figure 8:
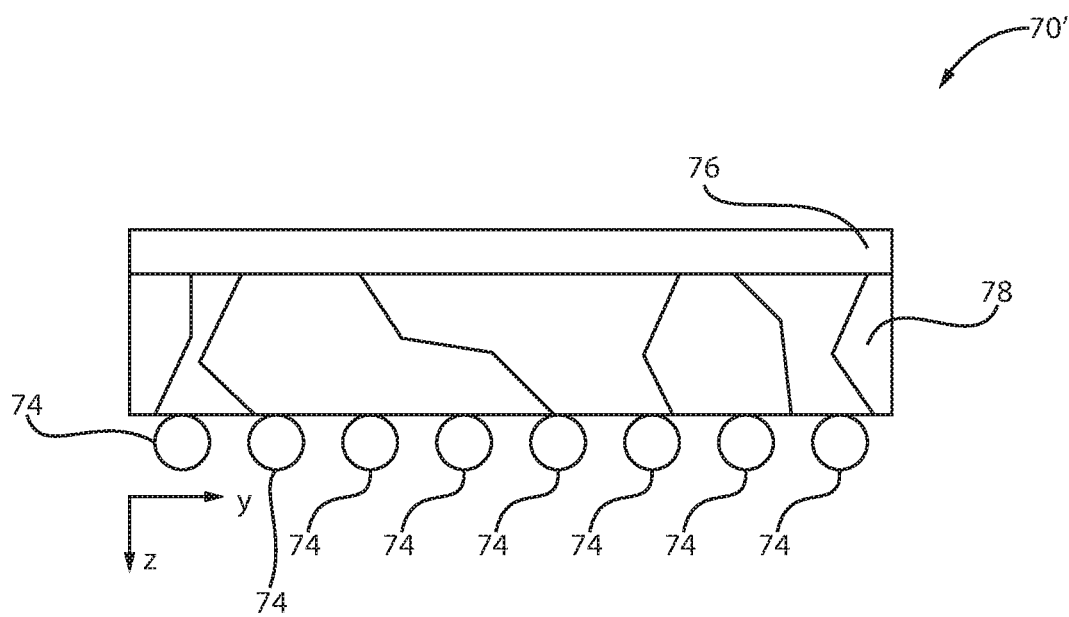
FIG. 8 is a cross-sectional view of the thin-film based structure random matrix network, in accordance with an embodiment of the present invention.

FIG. 8 is a cross-sectional view 70' of the thin-film based structure random matrix network, in accordance with an embodiment of the present invention.

The film 78 is shown between the top electrodes 76 and the bottom electrodes 74. The bottom electrodes 74 extend vertically into the page, whereas the top electrodes 76 extend horizontally relative to the page. The lines in the film 78 illustrate the random nature of the material of the film. Additionally, the resistance between the vertical bars 74 and the horizontal bars 76 is random.

FIG. 9 is a schematic diagram of a process flow for constructing a thin-film based structure, in accordance with an embodiment of the present invention.

The process flow starts with a structure 80 that includes a substrate 82, a bottom electrode 84 formed thereon, and a resistive film 86 formed over the bottom electrode 84. In one example, ion implantation 81 is applied to the structure 80. In another example, irradiation 83 is applied to the structure 80. In yet another example, the structure 80 is annealed 85 to poly-crystalize the resistive film 86. After ion implantation 81 or irradiation 83 or annealing 85, a top electrode 88 is formed over the resistive film 86.

Figure 10:
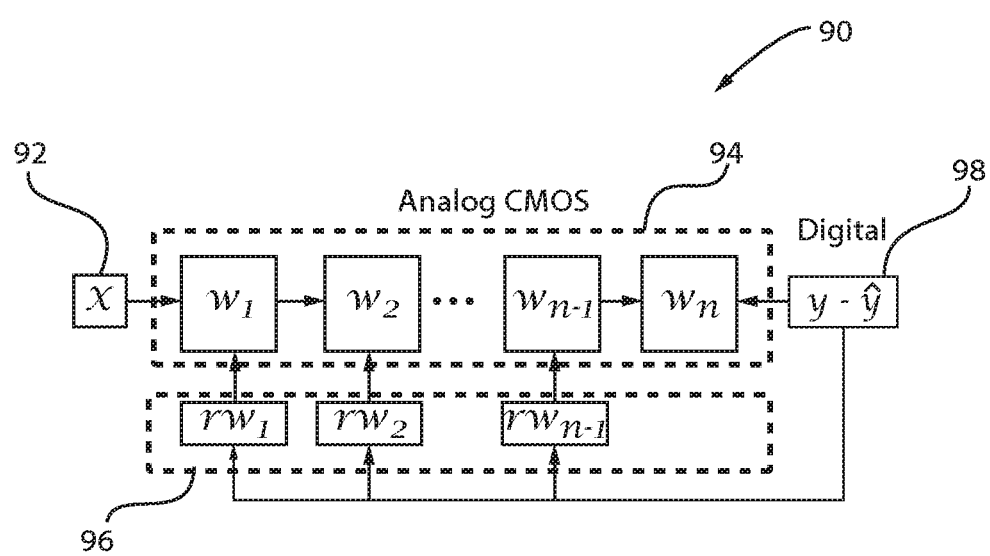
FIG. 10 is a schematic diagram of a random backpropagation system for executing a random backpropagation algorithm, in accordance with an embodiment of the present invention.

FIG. 10 is a schematic diagram of a random backpropagation system for executing a random backpropagation algorithm, in accordance with an embodiment of the present invention.

In various exemplary embodiments, the random backpropagation system 90 includes inputs 92 that are input into an analog complementary metal oxide semiconductor (CMOS) circuit 94 or RPU for weight matrices. The analog CMOS circuit 94 or RPU is fed from the random matrix array 96 and includes outputs 98.

In analog neuromorphic computing, the learning can be accelerated by pipelining the training dataset. It has been shown that a random backpropagation algorithm is advantageous for pipelining due to the fact that the backpropagation operation has no conflict with feedforward operations. Thus, two-terminal or three-terminal 2D cross-bar arrays can be useful in realizing fixed random weight matrices for a random backpropagation algorithm as no update is needed.

Thus, the exemplary embodiments of the present invention introduce an implementation of an analog CMOS or a non-volatile memory hybrid circuit for 2D cross-bar array implementation. In particular, the present invention utilizes an analog CMOS circuit 94 for weight matrices and non-volatile memory based circuits for random weight matrices. The present invention distinguishes itself from other implementations for neuromorphic computing systems in that the present invention employs hybrid capacitive and resistive memory elements for a 2D cross-bar array to realize an optimal operation for the random backpropagation algorithm. Adopting non-volatile memory elements for random matrices improves speed of the backpropagation, especially for the case whose output has large list of classifications (e.g., speech recognition needs ~100 k words as a list of classification).

Due to the fact that the weights of the random matrices are fixed and are not updated during the learning, non-volatile memory elements can be employed. Especially, resistive random access memory (ReRAM) (or other two-terminal resistive elements) can be employed, which may not be desirable for weight matrices due to the non-idealities in update operation (e.g., asymmetric in updating+/−values).

Thus, the random backpropagation algorithm provides for efficient pipelining, simpler circuitry, and faster backpropagation. The hardware implementation of the random backpropagation algorithm for analog neural networks is thus presented herein. Moreover, performing feedforward and updates using analog CMOS based 2D cross-bar arrays and performing backpropagation using non-volatile memory based 2D cross-bar arrays are employed herein.

Figure 11:
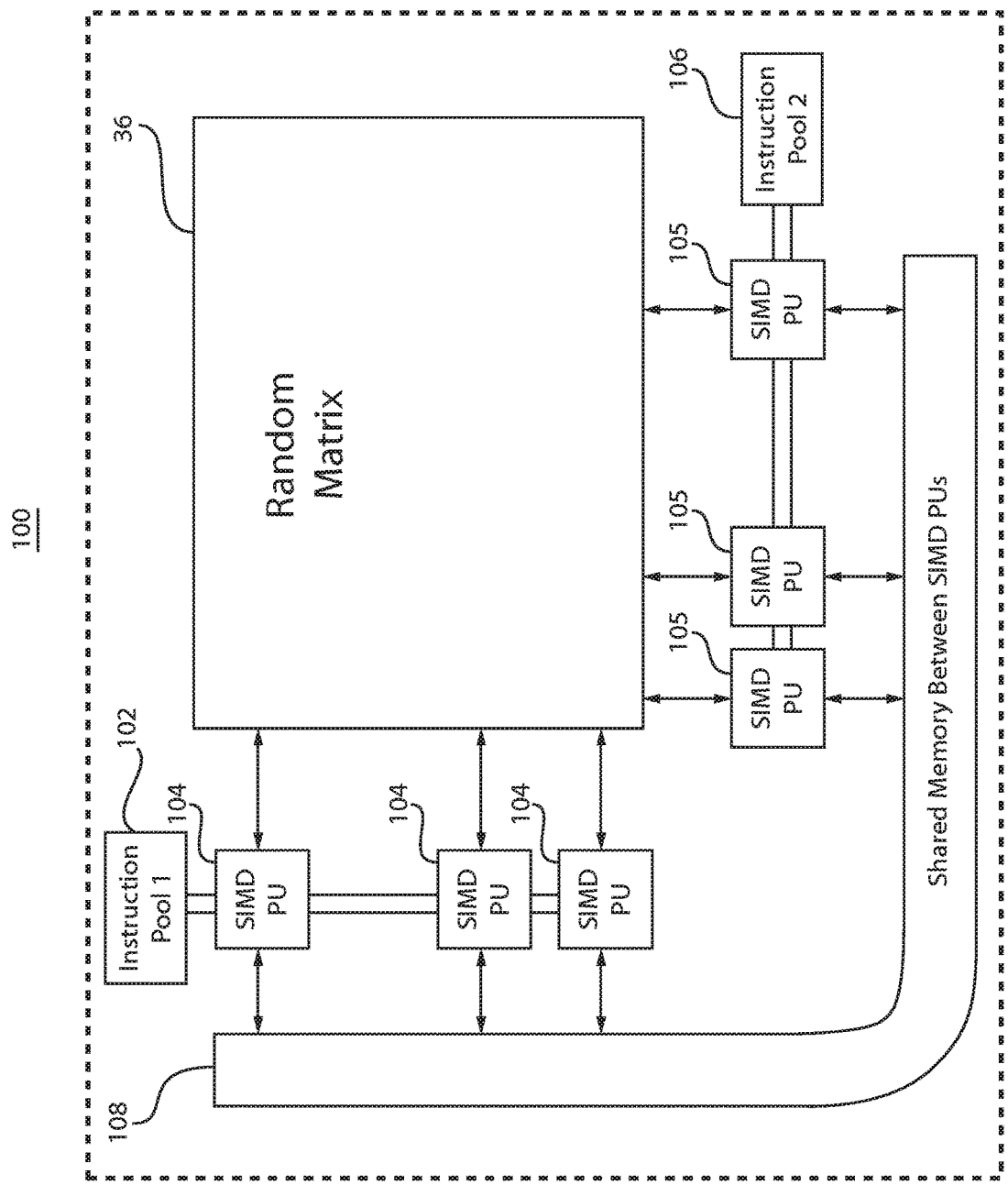
FIG. 11 is a schematic diagram of a single core architecture for a random matrix and single instruction, multiple data processing (SIMD) units coupled thereto, in accordance with an embodiment of the present invention.

FIG. 11 is a schematic diagram of a single core architecture for a random matrix and single instruction, multiple data processing (SIMD) units coupled thereto, in accordance with an embodiment of the present invention.

The architecture 100 includes a random matrix 36 at its core. The random matrix 36 can perform very fast analog computations, such as vector-matrix multiplication. The random matrix 36 can be accompanied by a 1D array of digital processing units 104 and 105, such as single instruction multiple data (SIMD) processing units (PUs) that can perform single instruction on multiple data and/or be in charge of translating the digital inputs/outputs to analog input/outputs. The random matrix 36 can be employed in tandem with programmable 1D array digital processors 104, 105.

Using this architecture 100, periphery digital processors 104, 105 can receive and execute instructions provided by code from instruction pools 102 and 106. Code can be written to program the architecture 100 to perform different applications or functions. For example, the architecture 100 can be programmed to find eigenvalues, perform matrix inversion, perform matrix decomposition or neural network operations, etc.

Figure 14:
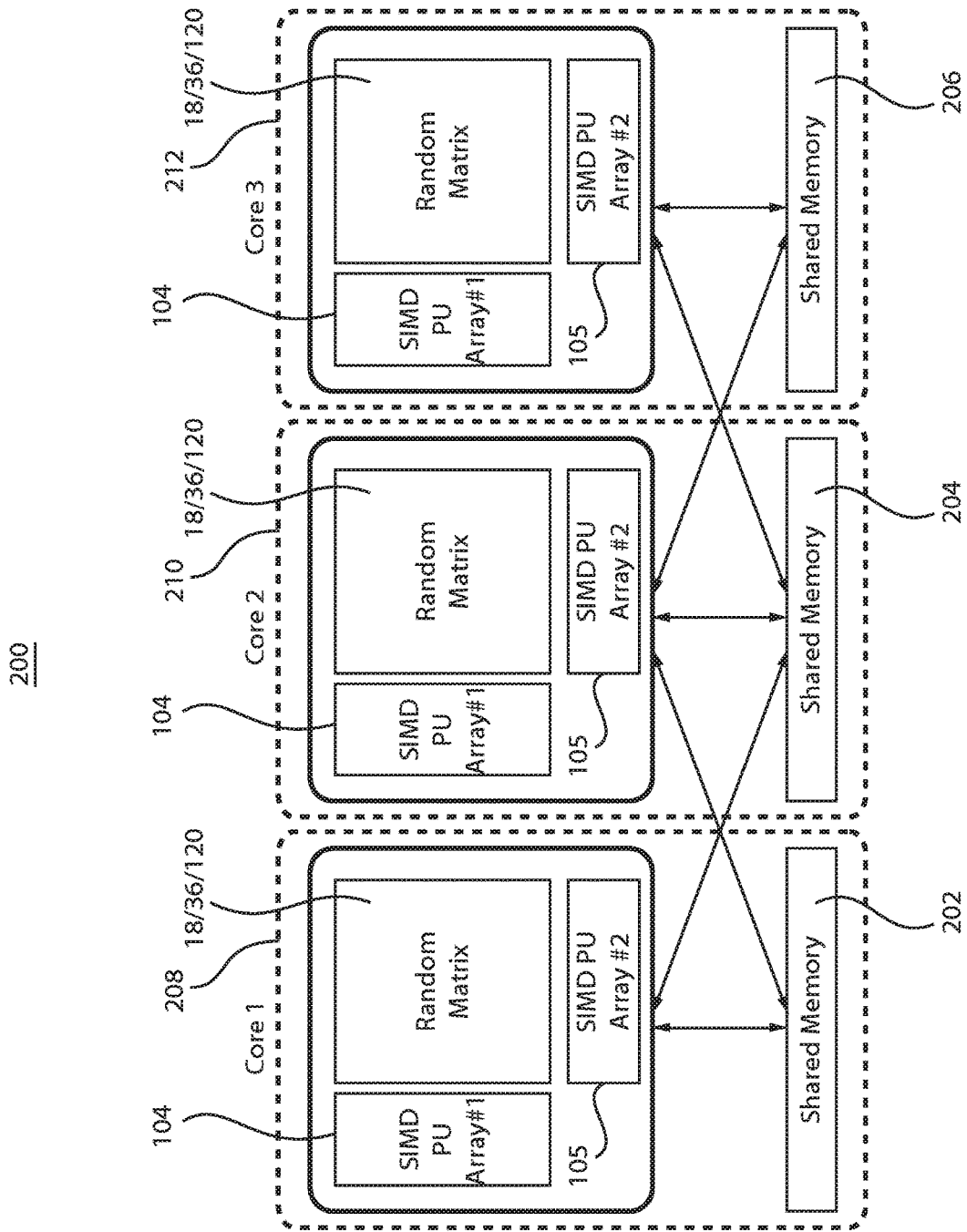
FIG. 14 is a schematic diagram of a multiple core architecture each having a random matrix and SIMD units coupled thereto, in accordance with an embodiment of the present invention.

The code (instructions) can be configured (written) to solve many problems using parallelism and locality in the architecture 100. The digital processors 104, 105 understand the instructions from instruction issuers or pools 102, 106 and can perform analog computations on the random matrix 36 very rapidly. The digital processors 104, 105 at the periphery can also be able to move data within the core 100 and between the cores (FIG. 14). The digital processors 104, 105 can employ and share memory 108 at the periphery of the architecture 100.

Figure 12:
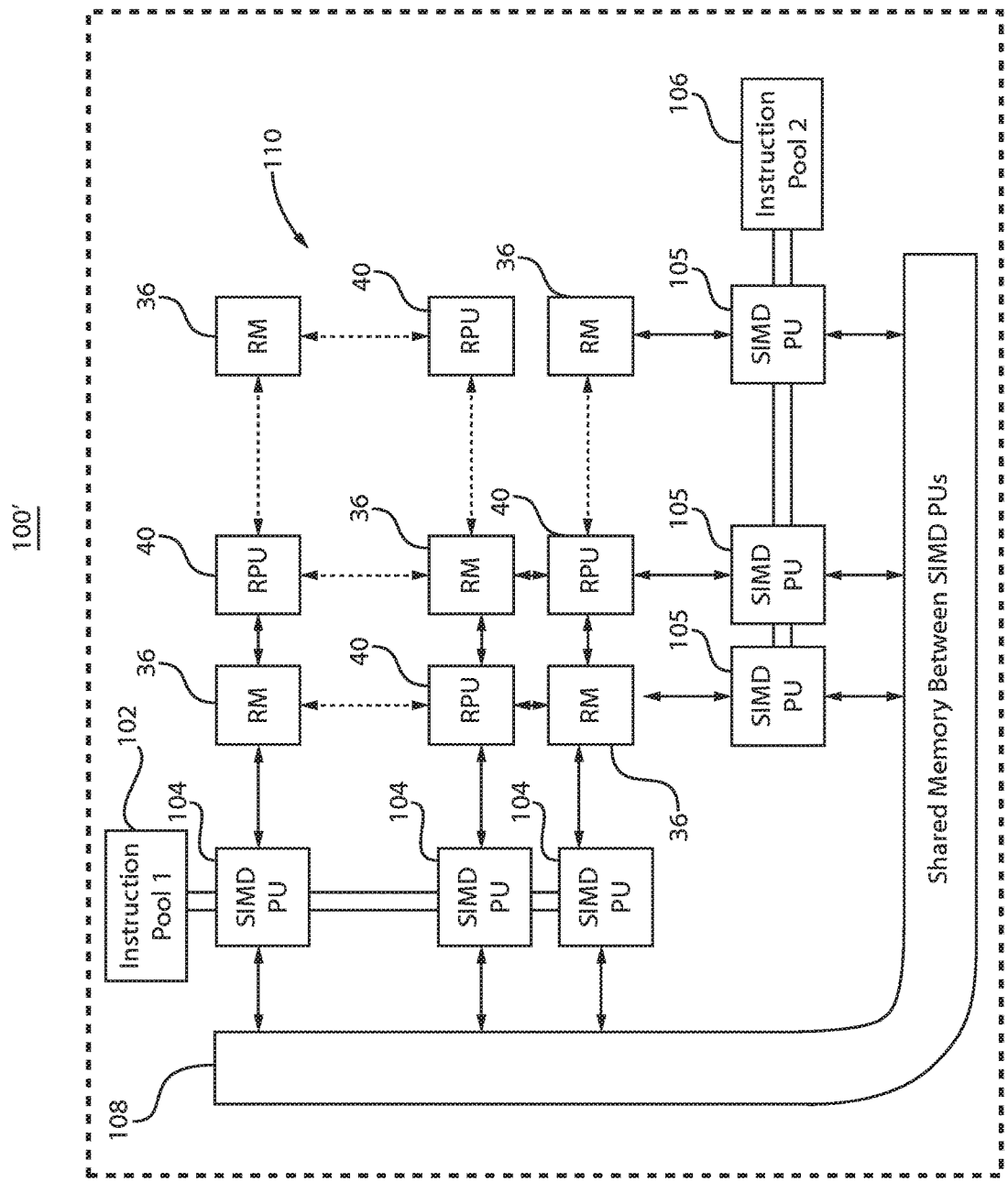
FIG. 12 is a schematic diagram of a single core architecture for resistive elements and random matrices coupled to SIMD units coupled thereto, in accordance with an embodiment of the present invention.

FIG. 12 is a schematic diagram of a single core architecture for resistive elements and random matrices coupled to SIMD units coupled thereto, in accordance with an embodiment of the present invention.

The architecture 100' includes an array 110 of alternating resistive elements 40 and random matrices 36 at its core. The random matrices 36 and the resistive elements 40 can perform very fast analog computations, such as vector-matrix multiplication. The array 110 of random matrices 36 and resistive elements 40 can be accompanied by a 1D array of digital processing units 104 and 105, such as single instruction multiple data (SIMD) processing units (PUs) that can perform single instruction on multiple data and/or be in charge of translating the digital inputs/outputs to analog input/outputs. The random matrices 36 and the resistive elements 40 can be employed in tandem with programmable 1D array digital processors 104, 105.

Using this architecture 100', periphery digital processors 104, 105 can receive and execute instructions provided by code from instruction pools 102 and 106. Code can be written to program the architecture 100' to perform different applications or functions. For example, the architecture 100' can be programmed to find eigenvalues, perform matrix inversion, perform matrix decomposition or neural network operations, etc.

The code (instructions) can be configured (written) to solve many problems using parallelism and locality in the architecture 100'. The digital processors 104, 105 understand the instructions from instruction issuers or pools 102, 106 and can perform analog computations on the array 110 of random matrices 36 and resistive elements 40 very rapidly. The digital processors 104, 105 at the periphery can also be able to move data within the core 100' and between the cores (FIG. 14). The digital processors 104, 105 can employ and share memory 108 at the periphery of the architecture 100'.

Figure 13:
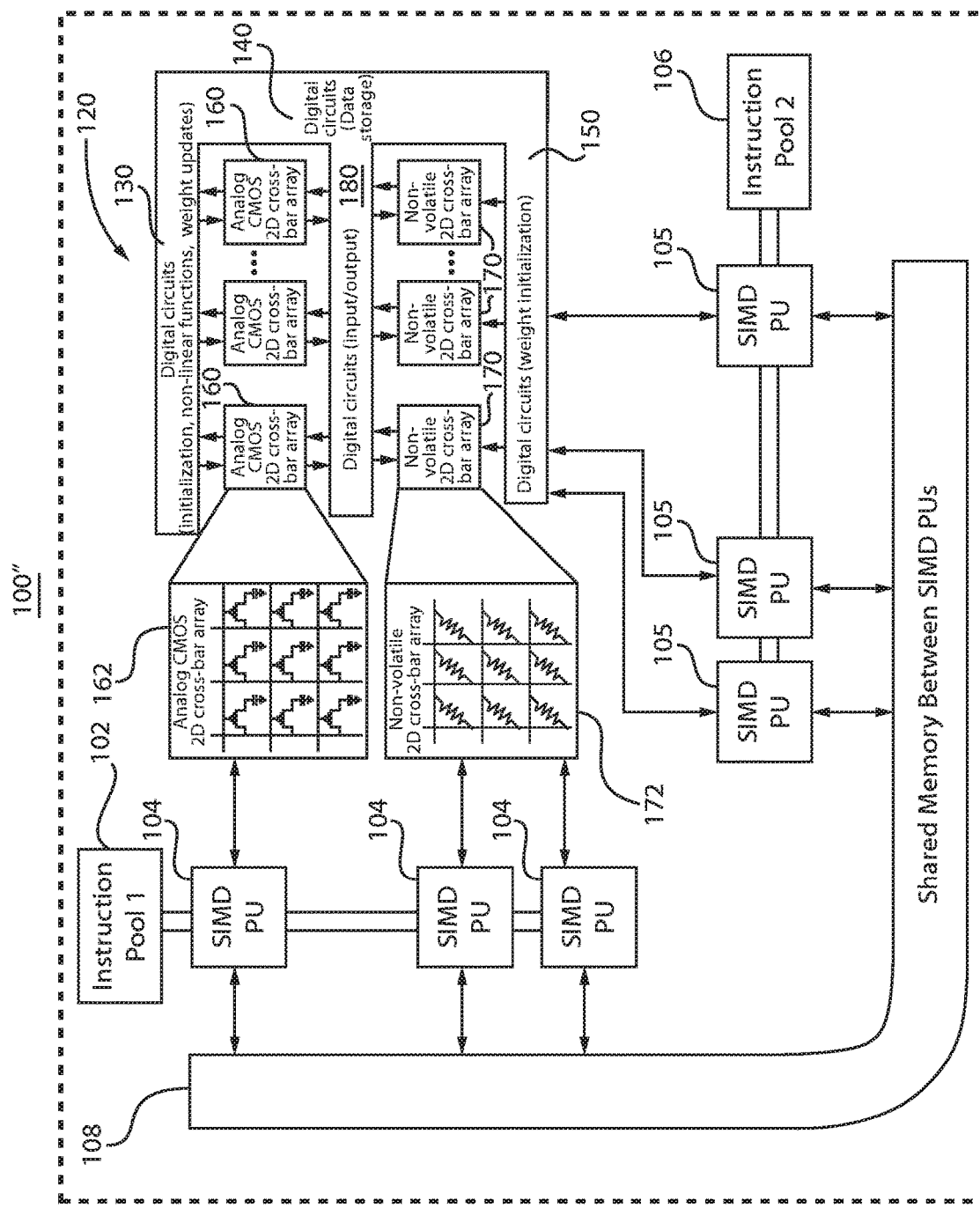
FIG. 13 is a schematic diagram of a single core architecture for an array of two-terminal or three-terminal random matrices and SIMD units coupled thereto, in accordance with an embodiment of the present invention.

FIG. 13 is a schematic diagram of a single core architecture 100'' for an array of two-terminal or three-terminal random matrices and SIMD units coupled thereto, in accordance with an embodiment of the present invention.

The random matrix 36 of FIG. 11 can be substituted with the digital circuit configuration 120 of FIG. 13. The hardware can include capacitive 2D cross-bar arrays 160 which store weights, resistive 2D cross-bar arrays 170 which store random weights, and digital circuits 130, 140, 150, 180 which control or store input and output data. The capacitive 2D cross-bar arrays 160 includes an array of transistors 162 and the resistive 2D cross-bar arrays 170 includes an array of resistive elements 172.

The digital circuits 130 can be used, e.g., for initialization, non-linear functions, and weight updates. The digital circuits 140 can be used, e.g., for data storage, the digital circuits 150 can be used, e.g., for weight initialization, and the digital circuits 180 can be used, e.g., for inputs/outputs processing.

FIG. 14 is a schematic diagram of a multiple core architecture each having a random matrix and SIMD units coupled thereto, in accordance with an embodiment of the present invention.

A multi-core architecture 200 shows inter-core communication with shared memory 202, 204, 206. The architecture 200 illustratively shows three cores 208, 210 and 212. However any number of cores can be employed. The cores 208, 210, 212 can address (read/write) shared memory 202, 204, 206 of their own memory and the memory of other cores as well. Although FIG. 14 illustrates the addressing shared memory only for neighboring cores, any cores can address the memory of any other core.

Each core 208, 210, 212 includes random matrix 18/36/120 and SIMD PU arrays 104 and 105 at the periphery. As before, the architecture 200 can be configured by writing code for the SIMD arrays 104, 105, which can be delivered as instructions for different operations.

In accordance with the present invention, the architectures 100, 100', 100'' and 200 can be configured to perform different operations. The architectures 100, 100', 100'', and 200 are particularly useful at computing partial results as a function of the data received from upstream neighbors in the arrays, storing the result within itself and passing the result downstream in a systolic array type manner.

Figure 15:
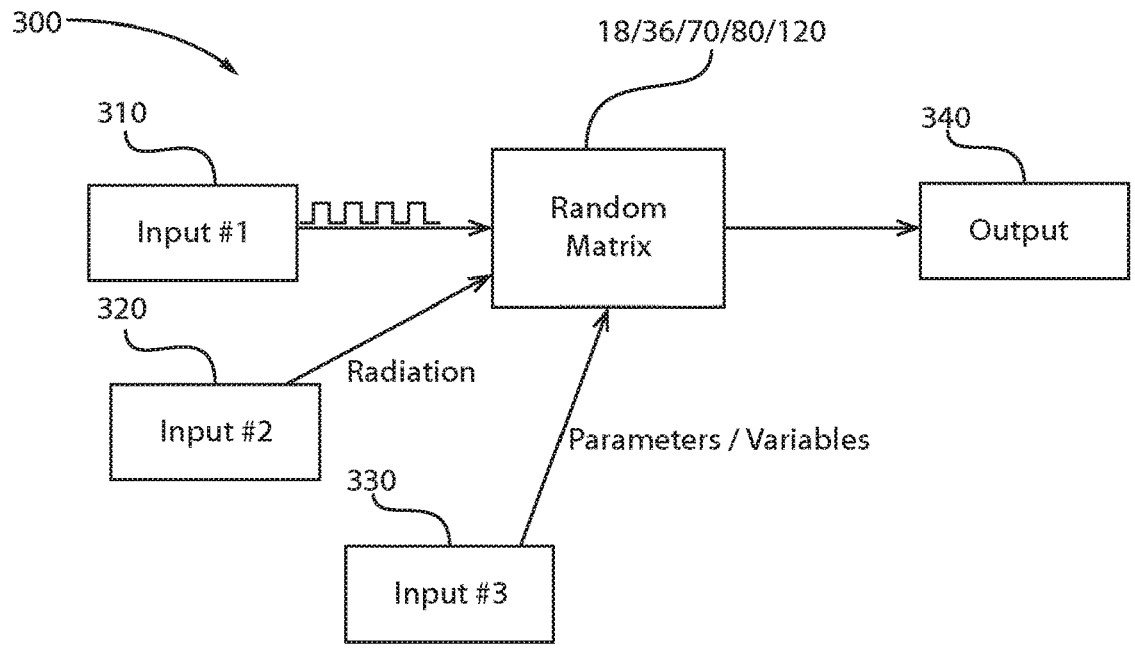
FIG. 15 is a schematic diagram of random matrix network initialization methods, in accordance with an embodiment of the present invention.

FIG. 15 is a schematic diagram 300 of random matrix network initialization methods, in accordance with an embodiment of the present invention.

The random matrices 18/36/70/80/120 described herein can be provided with random values from a plurality of different inputs. A first input 310 can be electrical pulses, a second input 320 can be radiation, and a third input 330 can be various parameters or variables of devices. Once the random matrices 18/36/70/80/120 are initialized, the data is processed, and output vectors are output by an output unit 340.

Regarding the second input 320, radiation has a random nature and can change a threshold voltage and therefore the channel resistance of the FET devices by generating electrons/holes in dielectrics. The fabricated random matrices therefore can be exposed to extreme ultraviolet (EUV), X-ray, gamma ray etc. to have a random distribution of resistance. Considering vulnerability of devices due to radiation, radiation blocking masks or radiation hardened processing can be adopted for the blocks other than random matrices.

Regarding the third input 330, dopants, film thickness, domain walls, polycrystallinity, etc. can induce a desired random distribution of resistances and capacitances in the fabricated random matrices. Therefore, the processes such as ion implantation, annealing, nucleation seeding, etc. can be used to prepare films and devices in random matrices without any additional initialization steps.

Figure 16:
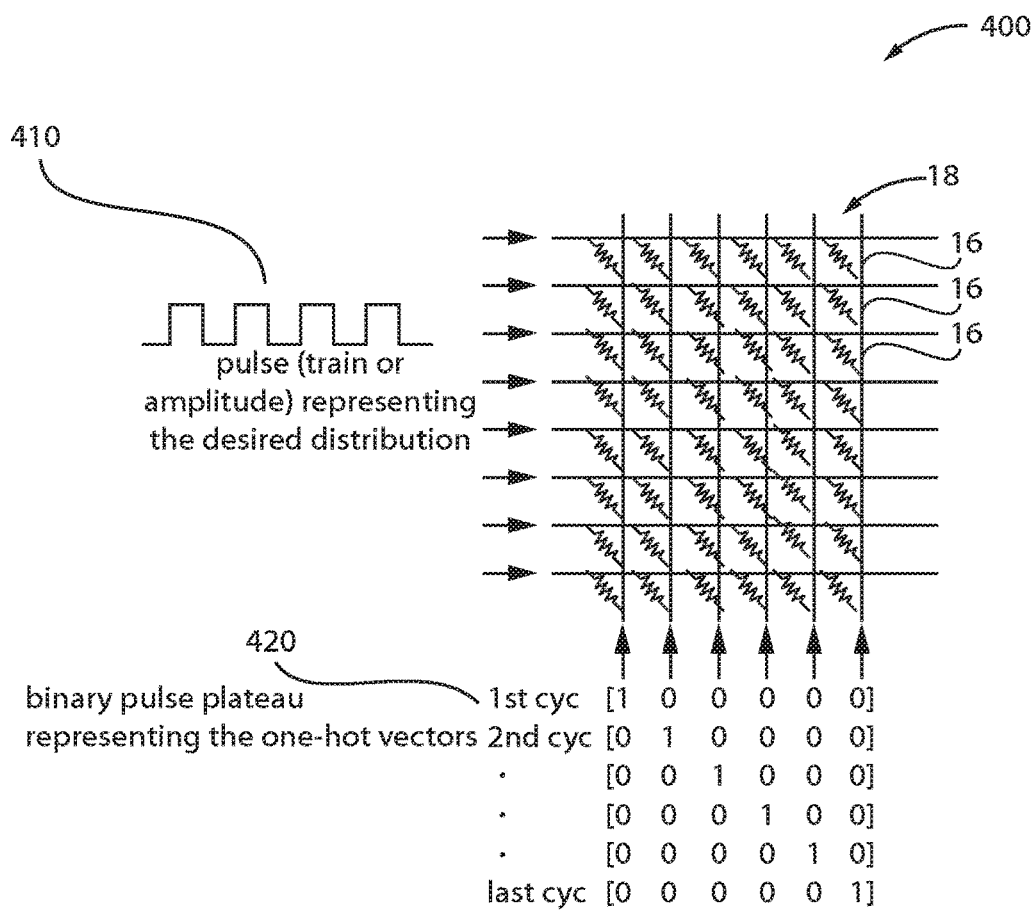
FIG. 16 is a schematic diagram of vector multiply column-by-column initialization, in accordance with an embodiment of the present invention.

FIG. 16 is a schematic diagram 400 of vector multiply column-by-column initialization, in accordance with an embodiment of the present invention.

Regarding the first input 310 (FIG. 15), two vectors 410 ($x$) and 420 ($y$) are input to the random matrices in electrical pulses. The longer input vector x has a uniform (or normal, etc.) distribution in signal strength, while the shorter vector y has a one-hot distribution with the "1" element moving from the first element to the last element after each initialization cycle. The matrix after N cycles (N as the dimension of y) has a desired distribution of resistance.

Regarding FIGS. 1-16, the methods described herein can be used in various applications, such as, e.g., in IBM's mainframes and servers, which include SIMD architectures. One such mainframe can be, e.g., the z13 mainframe. The z13 platform brings to bear a new architectural extension with instructions that allow reduced processor quiesce effects, lower cache misses, lower pipeline disruption, and increased parallelism with instructions that process several operands in a single instruction. Such mainframe systems could substantially benefit from SIMD processors that incorporate random network matrices. The z13 superscaler processor has 32 vector registers that include an instruction set including 139 new instructions. The enhanced instruction set allows a better flow for increased number of operands to be processed in a single instruction. This is all intended to provide support for increased analytic processing. With the boom in big data and analytics, the SIMD processor of the exemplary embodiments of the present invention can increase computational speed of such mainframes and/or servers. SIMD instructions improve the performance of complex mathematical models as well as permitting the integration of business models and analytic workloads on z Systems or mainframes in general. This all spells speed of processing.

The 32 new vector registers each have 128 bits. The 139 new instructions work on string operations, vector floating point operations and vector integer operations. Each register has multiple data elements of a fixed size. The code in the instructions shows the data format and the size of the elements. The elements can be in byte (16 8-bit operands), halfword (eight 16-bit operands), word (four 32-bit operands), doubleword (two 64-bit operands) or quadword (one 128-bit operand). The collection of the elements in a register is called a vector. All of the enhancements to the notion of vector processing can be used for increased speed with the processing of analytics-based use cases in utilizing SIMD architecture, such as the one described in the exemplary embodiments of the present invention where the random network matrices are incorporated. This gives the ability to accelerate workloads by using new instructions that act on many data elements at once. This can even occur at the single instruction level. This can help an organization meet shrinking batch windows by increasing throughput times. This helps the workloads keep up with new incoming transactions and allows extraction of real-time insight from consumer and financial transactions.

Another benefit with the SIMD architecture of the exemplary embodiments is that SIMD architecture allows workloads from earlier z Systems servers to run unchanged on the z13 mainframe. Workloads can now also be changed and enabled for higher throughput with SIMD acceleration. The SIMD processor of the exemplary embodiments has some very interesting opportunities with processing applications related to analytics, as throughput is important to harvest the insight of the transaction. Analytic transactions can be run in close proximity to z Systems data with efficiency and maximum performance. This also increases programmer productivity when developing analytics workloads where speed and performance optimization is paramount.

Therefore, the SIMD architecture disclosed herein can either supplement current SIMD processors or replace current SIMD processors in order to optimize performance by incorporating random matrix networks having two-terminal device arrays or three-terminal device arrays or thin-film based structures. The SIMD architecture described herein can also be used in graphics processing units (GPUs) and other types of 3D graphics processing implementations. Of course, one skilled in the art can contemplate incorporating the SIMD architecture described herein into any type of processing unit that can be incorporated into any type of computing system for any type of application without any limitation.

Figure 17:
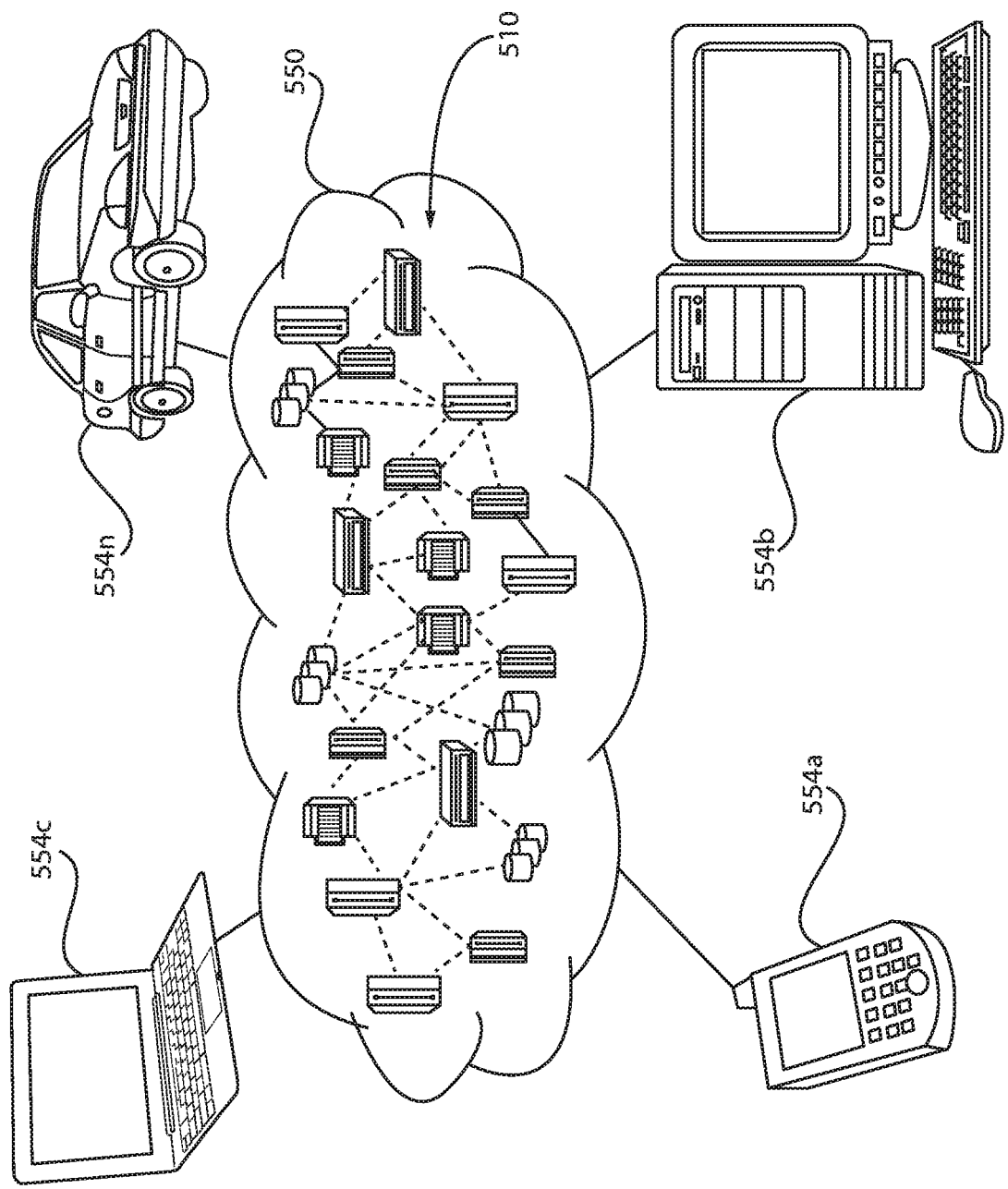
FIG. 17 is a block/flow diagram of an exemplary cloud computing environment, in accordance with an embodiment of the present invention.

FIG. 17 is a block/flow diagram of an exemplary cloud computing environment, in accordance with an embodiment of the present invention.

It is to be understood that although this invention includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 17, illustrative cloud computing environment 550 is depicted for enabling use cases of the present invention. As shown, cloud computing environment 550 includes one or more cloud computing nodes 510 with which local computing devices used by cloud consumers, such as, for example, personal digital assistant (PDA) or cellular telephone 554A, desktop computer 554B, laptop computer 554C, and/or automobile computer system 554N can communicate. Nodes 510 can communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 15 are intended to be illustrative only and that computing nodes 510 and cloud computing environment 550 can communicate with any type of computerized device over any type of network and/or network addressable connection (e.g., using a web browser).

FIG. 18 is a schematic diagram of exemplary abstraction model layers, in accordance with an embodiment of the present invention. It should be understood in advance that the components, layers, and functions shown in FIG. 18 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities can be provided: virtual servers 671; virtual storage 672; virtual networks 673, including virtual private networks; virtual applications and operating systems 674; and virtual clients 675.

In one example, management layer 680 can provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and random matrix operations 696.

Still yet, any of the components of the present invention could be created, integrated, hosted, maintained, deployed, managed, serviced, etc. by a service supplier who offers to provide a method for performing random matrix operations. Thus, the present invention describes a process for deploying, creating, integrating, hosting, maintaining, and/or integrating computing infrastructure, including integrating computer-readable code into the SIMD-based random matrix network, wherein the code in combination with the SIMD-based random matrix network is capable of performing a method for performing random matrix operations. In another embodiment, the invention provides a business method that performs the process blocks/steps of the invention on a subscription, advertising, and/or fee basis. That is, a service supplier, such as a Solution Integrator, could offer to provide a method for performing random matrix operations. In this case, the service supplier can create, maintain, support, etc. a computer infrastructure that performs the process blocks/steps of the invention for one or more customers. In return, the service supplier can receive payment from the customer (s) under a subscription and/or fee agreement and/or the service supplier can receive payment from the sale of advertising content to one or more third parties.

The descriptions of the various embodiments of the present invention have been presented for purposes of illustration, but are not intended to be exhaustive or limited to the embodiments described. Many modifications and variations will be apparent to those of ordinary skills in the art without departing from the scope and spirit of the described embodiments. The terminology used herein was chosen to best explain the one or more embodiments, the practical application or technical improvement over technologies found in the marketplace, or to enable others of ordinary skills in the art to understand the embodiments described herein.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to at least one processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks or modules.

The computer readable program instructions can also be loaded onto a computer, other programmable data processing apparatus, or other device to cause a series of operational blocks/steps to be performed on the computer, other programmable apparatus or other device to produce a computer implemented process, such that the instructions which execute on the computer, other programmable apparatus, or other device implement the functions/acts specified in the flowchart and/or block diagram block or blocks or modules.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method for employing random matrix hardware for machine learning (which are intended to be illustrative and not limiting), it is noted that modifications and variations can be made by persons skilled in the art in light of the above teachings. It is therefore to be understood that changes may be made in the particular embodiments described which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method executed by a processor for training a random matrix network, the method comprising:
   initializing values of a random matrix by a random initializer;
   inputting, by an input generator, a plurality of first vectors into the random matrix; and
   outputting, by an output vector reader, a plurality of second vectors from the random matrix to be fed back into the random matrix for training.

2. The method of claim 1, wherein the random matrix includes a plurality of two-terminal devices.

3. The method of claim 2, wherein the two-terminal devices are resistive devices formed in a cross-bar array.

4. The method of claim 1, wherein the random matrix includes a plurality of three-terminal devices.

5. The method of claim 4, wherein the three-terminal devices are field effect transistors (FETs) formed in a cross-bar array.

6. The method of claim 1, wherein the random matrix includes a film-based device.

7. The method of claim 6, wherein the film-based device is formed that such top and bottom electrodes are aligned in a cross-bar array and a film is formed between the top and bottom electrodes.

8. The method of claim 1, wherein the initializing occurs by electrical pulses inputted to the random matrix.

9. The method of claim 1, wherein the initializing occurs by employing radiation used to adjust device parameters of devices forming the random matrix.

10. The method of claim 1, wherein the initializing occurs by adjusting fabrication parameters of devices forming the random matrix to obtain specific random distributions.

11. A random matrix network, comprising:
    a random initializer for initializing values of a random matrix;
    an input generator for inputting a plurality of first vectors into the random matrix; and
    an output vector reader for reading a plurality of second vectors outputted from the random matrix to be fed back into the random matrix for training.

12. The random matrix network of claim 11, wherein the random matrix includes a plurality of two-terminal devices.

13. The random matrix network of claim 12, wherein the two-terminal devices are resistive devices formed in a cross-bar array.

14. The random matrix network of claim 11, wherein the random matrix includes a plurality of three-terminal devices.

15. The random matrix network of claim 14, wherein the three-terminal devices are field effect transistors (FETs) formed in a cross-bar array.

16. The random matrix network of claim 11, wherein the random matrix includes a film-based device.

17. The random matrix network of claim 16, wherein the film-based device is formed that such top and bottom electrodes are aligned in a cross-bar array and a film is formed between the top and bottom electrodes.

18. The random matrix network of claim 11, wherein the initializing occurs by electrical pulses inputted to the random matrix.

19. The random matrix network of claim 11, wherein the initializing occurs by adjusting fabrication parameters of devices forming the random matrix to obtain specific random distributions.

20. A digital processing architecture for training and/or inferencing a random matrix, comprising:
    a random matrix network including at least the random matrix having an array of elements connected between row and column lines;
    at least one first single instruction, multiple data processing (SIMD) unit connected to the row lines;
    at least one second SIMD unit connected to the column lines; and
    a shared memory shared between the at least one first and second SIMDs.

* * * * *